April 8, 1958  A. S. SWANSON ET AL  2,829,391
POWER DRIVEN CLEANING MACHINE HAVING FLUID CONTROL SYSTEM
Filed May 7, 1953  7 Sheets-Sheet 1

INVENTORS
ALBERT S. SWANSON
RALPH C. PEABODY
BY Paul G. Moore Klugger
ATTORNEYS

FIG. 3

INVENTORS
ALBERT S. SWANSON
RALPH C. PEABODY
ATTORNEYS

INVENTORS
ALBERT S. SWANSON
RALPH C. PEABODY
BY Paul, Mooren Rugger
ATTORNEYS

United States Patent Office 2,829,391
Patented Apr. 8, 1958

2,829,391

POWER DRIVEN CLEANING MACHINE HAVING FLUID CONTROL SYSTEM

Albert S. Swanson and Ralph C. Peabody, Minneapolis, Minn., assignors to G. H. Tennant Company, Minneapolis, Minn., a corporation of Minnesota Application May 7, 1953, Serial No. 353,478

6 Claims. (Cl. 15—83)

This invention relates to new and useful improvements in cleaning machines and more particularly to new and useful improvements in power driven industrial cleaning machines.

The cleaning of large areas and areas on which dirt has become heavily encrusted, such as factories, warehouses, airports, docks, and platforms and roadways therearound, has long been a major problem requiring large size cleaning machines or extensive crews of men to sweep the vast extent of area which must necessarily be cleaned. The use of huge crews of men, working with inefficient cleaning tools has been highly disadvantageous, not only because of the excessive cost involved, but because of the extremely inadequate cleaning results produced. With the advent of heavy machinery and congested conditions in factories, dirt, grease and other material has been produced in excessive quantities on the floors and has become so encrusted thereon that it is relatively impossible to do an adequate job by crews of men with hand tools.

Furthermore, in many places, such as factories, warehouses, airports, and so on, it is necessary to carry on cleaning and sweeping operations while business is being conducted or while working employees or invitees are in the places being cleaned. This has made it extremely desirable to provide some means for quickly and conveniently cleaning the floors.

While attempts have been made to substitute power driven machinery for the hand cleaning methods, heretofore used, such substitution has not been entirely satisfactory. Power cleaning equipment has been disadvantageous because of the size or inefficiency of operation, or because of its inability to carry a sufficient load and automatically dump the same at a proper time. Power cleaning equipment has also been disadvantageous because it has been poorly designed for carrying out cleaning operations over irregular floors and removing the dirt therefrom without scarring or marring the floors and because of other inefficiencies of operation.

It is therefore an object of this invention to provide a new and improved power cleaning machine having a construction of maximum efficiency and ease of operation;

It is still a further object of this invention to provide an improved cleaning machine which is extremely maneuverable and which may be operated by one person for cleaning and unloading debris;

It is still a further object of this invention to provide an improved power cleaning machine which is provided with means for cleaning floors having irregularities therein without scarring or marring such floors;

Still a further object of this invention is the provision of unique means whereby a rotary brush carried by this cleaning machine will be raised and lowered in conformance with irregularities of the surface being swept;

Still a further object of this invention is to provide an improved cleaning machine which will effectively clean floors which are highly encrusted with dirt or other material;

It is still a further object of this invention to provide an improved cleaning machine having an improved compartment for collecting the debris, said compartment being positioned so that the entrance thereof is closely adjacent the surface being cleaned and yet may raise or lower as irregularities in the surface are encountered or for clearing obstacles;

It is still a further object of this invention to provide an improved power cleaning machine having a container or pan for the refuse material, which container may be operator actuated to automatically disengage itself from the cleaning machine and eject the material contained therein into a stationary receptacle;

It is still a further object of this invention to provide an improved power cleaning machine having a dirt collecting hopper capable of being elevated for ejecting the dirt therefrom so as to permit easy handling by the operator for dumping operations;

It is still a further object of this invention to provide a power driven cleaning machine having a new and unique hydraulic control system;

It is likewise a further object of this invention to provide a power driven cleaning machine for a fluid operated brush control system whereby said fluid operated brush control system will operate as a shock absorber to reduce brush "chatter" or vibration;

It is still another object of this invention to provide an improved power cleaning machine and rotary brush construction in conjunction therewith whereby the brush mechanism may be raised or lowered at the will of the operator and whereby the pressure of the brush upon the floor may be set at a predetermined amount;

Another object of this invention resides in a power driven industrial cleaning machine having means for elevating and depressing the cleaning brush thereof and means for detaching and re-positioning the cleanings container whereby the cleaner may be used by inexperienced operators, and in the provision of a rugged and dependable machine built for extremely heavy duty surface or cleaning over large areas;

Still other objects of this invention reside in the specific constructional features disclosed including the brush suspension construction and hydraulic control construction;

Other and further objects of the invention are those which are inherent and apparent in the apparatus as illustrated, described and claimed.

The invention is described with reference to the drawings in which corresponding numerals refer to the same parts and in which.

Figure 1:
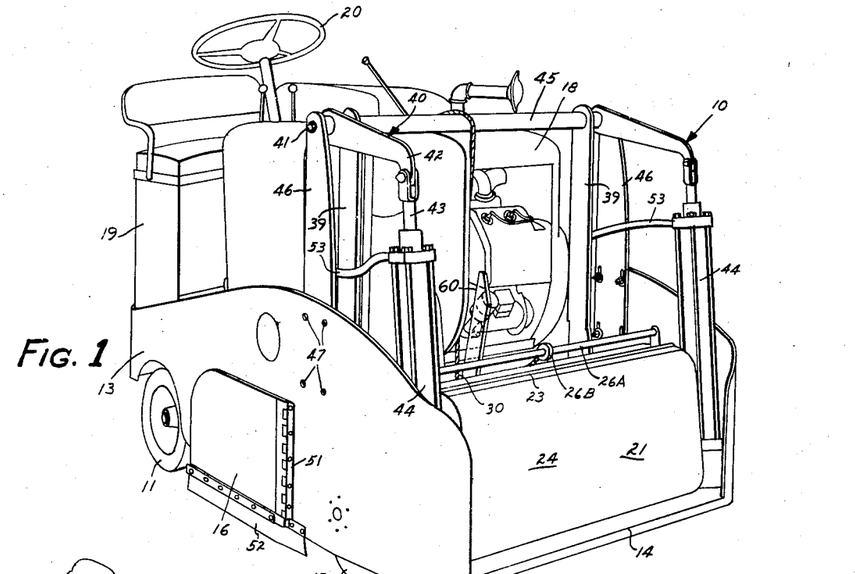
Figure 1 is a perspective view of our machine showing the debris receptacle in position thereon.

In general, the machine of the instant invention comprises a self-propelled mobile dirt cleaning and carrying machine which is provided with a power driven rotary brush mechanism having a unique drive and suspension whereby the brush will automatically respond to being raised and depressed by encounter with irregularities on a floor surface. The machine is provided with an open-bottomed enclosure adjacent the floor in which the brush is substantially sealed in respect to the surface to be cleaned whereby a slight negative pressure may be induced in said enclosure for the control of dust. The machine frame includes a hopper situated in advance to the brush so that material swept, as the machine moves over the area being cleaned, is projected by the brush into the hopper. A suction blower connected to the brush enclosing housing is provided so as to withdraw air therefrom for the creation of said negative pressure. The supporting frame is provided with mechanism whereby the hopper or container for retaining the sweepings may be mechanically and hydraulically elevated from a sweeping position to a removed position for dumping debris into a receptacle. This is illustrated by the views of Figures 1 and 2.

Specifically, the machine 10 comprises a supporting frame positioned on a pair of steerable driving wheels 11 and a pair of idler wheels 12. The frame comprises a heavy-duty supporting shell enclosure 13 cut away at 14 for the admission of the hopper and having a pair of doors 16, one on either side of the machine, for access to the relatively sealed compartment provided for the brush mechanism.

Supported by the frame is a motor 18, a seat for the operator 19 and a steering wheel 20. Also supported by the frame is a hopper or dirt pan 21. The dirt pan 21 comprises a substantially wedge-shaped pan enclosed on the bottom and two sides and at a portion 22 of the top thereof. Secured to the portion 22 of the top is a piano-type hinge 23 which is usually bolted to portion 22 and welded to gate 24. Gate 24 is provided with a pair of extending eccentric lugs 25 (one of which is shown in Figure 3) by means of which a pair of bellcrank latches 26 may maintain gate 24 in the closed position shown in Figures 1 and 3. In this position, the gate 24, the sidewalls and the bottom of the pan 21 provide a four-sided closure for a wedge-shaped pan having a rearwardly directed opening and downwardly and rearwardly slanting side walls as shown in Figures 2 and 3. Latches 26 are each pivoted at 27, one to each side wall of the hopper or pan 21 and are each provided with a spring 28 attached to a bracket 29 which is likewise secured to the side wall of the pan 21. Latches 26 are connected by a common rod 26A around which is secured a collar 26B to which is attached a pull cord 30 which passes through a loop member 31 secured to the engine housing and which may be operated by an operator as shown in Figure 2.

Figure 2:
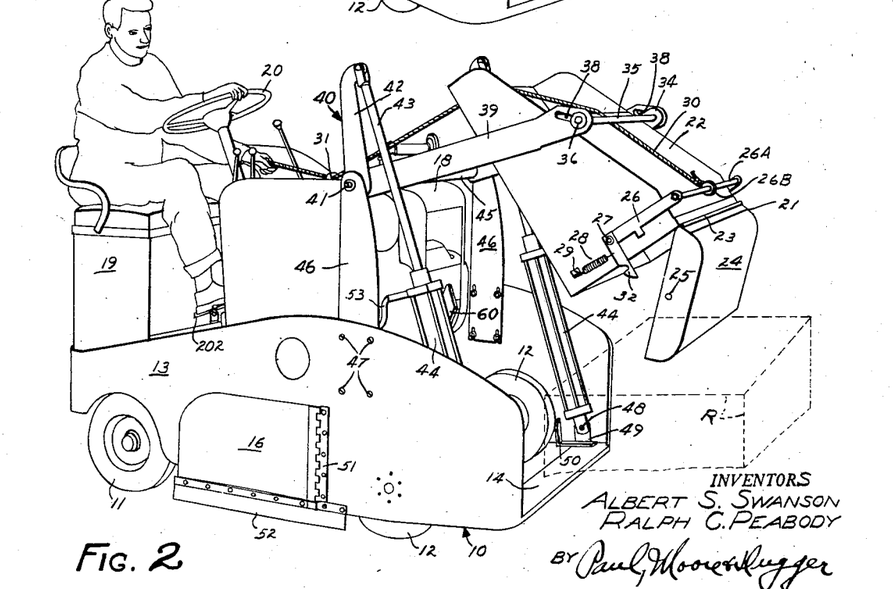
Figure 2 is likewise a perspective view of our machine but showing the debris receptacle elevated therefrom and in dumping position.
Figure 3:
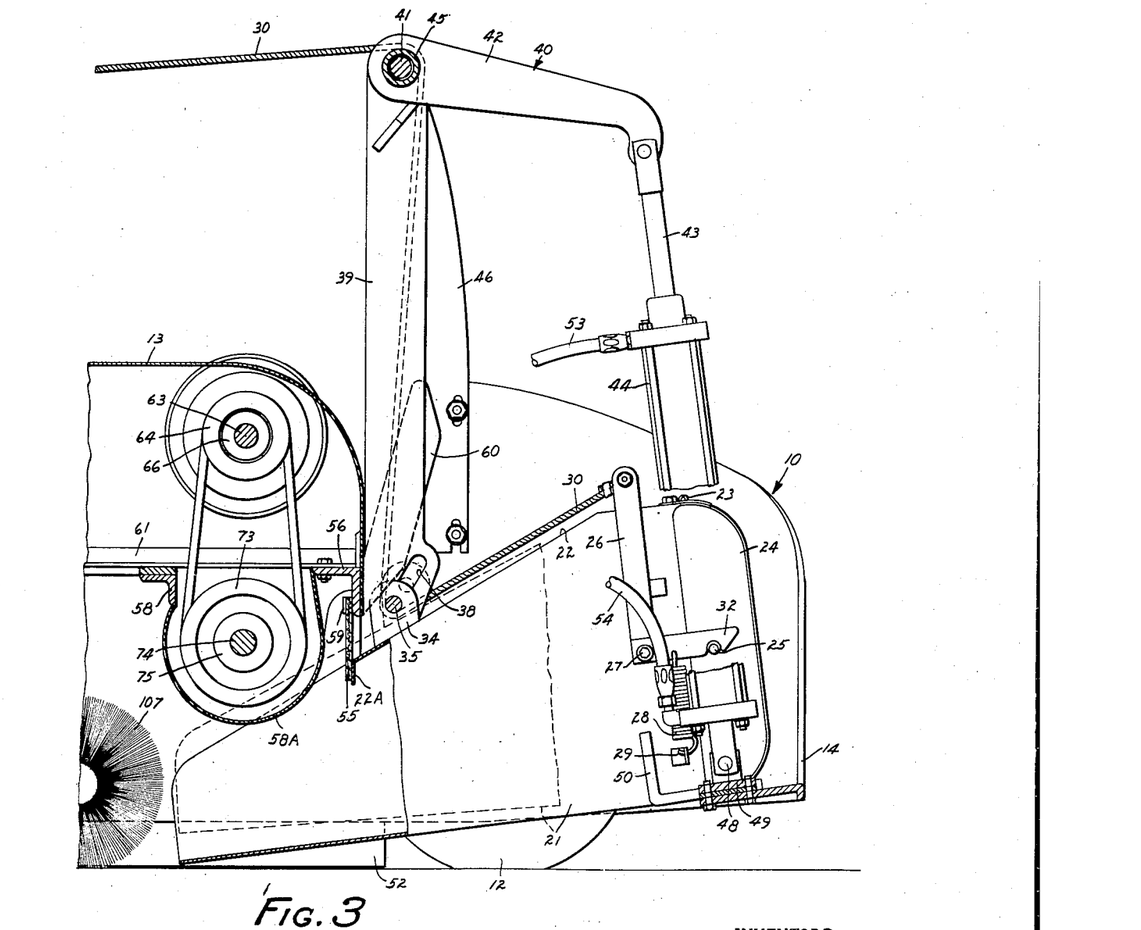
Figure 3 is a fragmentary enlarged longitudinal vertical sectional view of the front end of the machine and showing the debris receptacle in position thereon.

Thus, when the pan 21 is in the position of Figure 2, the operator may pull the flexible member 30 thus pivoting the latches 26 around pivots 27 (counterclockwise with reference to Figure 2) which will cause lugs 25 to be released from the apertures in arms 32 of latches 26 and thus the bottom of pan 21 will swing by gravity to the full line position of Figure 2. In this position, dirt will be ejected from the hopper by gravity and fall into the receptacle R as shown in dotted lines.

The hopper 21 is supported from a pair of extending ears 34 through which is passed a rod 35 having a keeper 36 at each end thereof. Rod 35 is likewise passed through the elongated apertures 38 in arms 39 of a bellcrank lifting member generally designated 40. Member 40 is pivoted at 41 and is provided with arms 42 to which are attached the piston rods 43 of hydraulic cylinders 44.

When the pan 21 is in the position shown in Figure 1 or 2, the rod 35 is seated in the forward ends of apertures 38. Such seating allows movement of rod 35 in apertures 38 which in turn allows forward and upward movement of the pan 21 so that the lip of the pan is free to clear any floor obstacles when it is in the position of Figure 1, particularly when the machine is being backed over any floor surface.

Arms 39 and 42 are spaced apart as is shown best with reference to Figure 1 and are integrally connected to a sleeve member 45 through which passes an elongated shaft to provide the pivot at 41. The entire bellcrank lifting member, generally designated 40, which supports the pan 21 is supported by a pair of upwardly directed spaced parallel pan lift supports 46 which are attached to shell 13 by a plurality of bolts 47 and is consequently supported thereon.

Each one of the cylinders 44 is pivotally mounted at 40 to a bracket 49 attached to the forward end of the shell 13 as shown best in Figure 2. Adjacent bracket 49 is an L-shaped guide member 50 which serves to position the sides of pans 21 as it is moved to the full-line position of Figure 1 from the full-line position of Figure 2. When the cylinders 44 are hydraulically actuated the entire bellcrank lifting member 40 is moved from the position in Figure 1 to the position in Figure 2, and in the latter position the gate 24 may be unlatched to dump the contents of the pan 21, all as illustrated in Figure 2.

Each one of the doors 16 in shell 13 is provided with a continuous hinge 51 which is bolted to the shell 13 and has a ground engaging flap 52 of flexible material secured thereto. Flap 52 operates to contact the surface being swept and to cooperate with interior structure as will be later explained to provide the reasonably air-tight open bottom enclosure.

Referring now specifically to Figure 3, it will be seen that each of the hydraulic cylinders 44 is provided with a flexible line 53 connected to the top thereof and a second flexible line 54 connected to the bottom thereof which provide fluid connections thereto for reciprocating the piston as will be more fully explained later.

Also shown in Figure 3 is a flap sealing member 55 which is retained on a transverse angle support or brace 56 by a strap retainer 59 which may be secured to the angle brace 56 by any suitable means. Angle brace 56 extends between and is welded to the sides of the heavy duty supporting shell enclosure 13, as is spaced angle brace or support 58. The flap 55 serves to cooperate with the depending edge 22A of the top 22 of the pan 21 to provide a substantially tight seal therebetween, and extends transversely throughout the width of the shell 13. It also cooperates with flaps 52 to provide the reasonably air-tight open bottomed enclosure previously referred to and more fully explained subsequently.

Also shown in Figure 3 and positioned on the transverse angle brace 56 is a guard 60 which serves upon occasion to engage the lip of the pan 21 as it is being moved from the position of Figure 2 to the position of Figure 1 so that the pan will be guided accurately into the position of Figure 1.

Guard 60 is provided so as to protect the motor and adjacent mechanism from damage in the event that the pan 21 should oscillate on its support as it is being moved from the position of Figure 2 to the position of Figure 1. Normally the guard 60 does not function and the pan 21 moves smoothly from the position of Figure 2 to the position of Figure 1 and into the position best shown in Figure 3, as the arms 39 descend from the position of Figure 2 to the position of Figure 1, but in the event that the pan should fail to smoothly descend into position, the guard 60 will engage the lip of the pan as it is moved from the position of Figure 2 to the position of Figure 1 so that it will move accurately and speedily into the position shown best in Figure 3.

Figure 5:
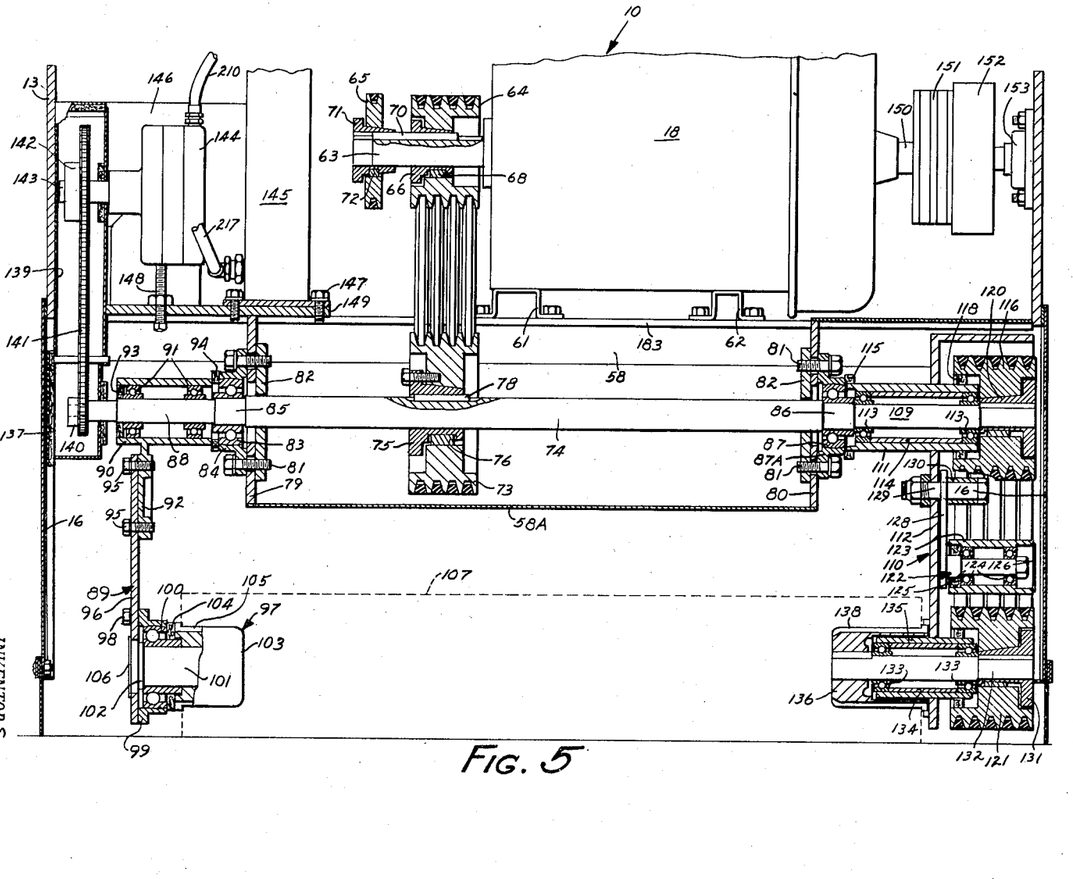
Figure 5 is a transverse fragmentary vertical sectional view illustrating the brush drive and suspension.

The motor 18 is supported on a pair of channel members 61 and 62 shown best in Figures 3 and 5 which are in turn bolted to the transverse angle supports 56 and 58. The motor shaft 63 is provided with a multiple belt pulley 64 and a single belt pulley 65 exterior thereof. The multiple belt pulley 64 is provided with a taper-lock bushing 66 which is keyed to the pulley by key 68 and keyed to the shaft 63 by key 70.

The single belt pulley 65 is likewise provided with a taper-lock bushing 71 which is keyed to the shaft 63 by key 70 and keyed to the pulley by key 72. Pulley 64 connects to pulley 73 for driving countershaft 74 and pulley 65 connects to a blower, described later.

Pulley 64 is provided with a plurality of V-belts which are passed over a second multiple belt pulley 73 on countershaft 74. Pulley 73 is likewise provided with a taper-lock bushing 75, which is keyed thereto by a key 76 and keyed to the countershaft 74 by a key 78. Thus, rotation of shaft 63 will rotate pulleys 64 and 73 through the plurality of V-belts connecting these pulleys and thus rotate the countershaft 74.

A pair of depending plates 79 and 80 are provided for supporting the countershaft 74. Each of these plates depends as shown best in Figure 5 and is provided with a plurality of apertures through which bolts 81 are passed and threaded into retaining member 82. Secured to plate 79 by bolts 81 is a bearing 83 positioned in self-aligning bearing block 84. Shaft 74 is supported at reduced portion 85 in bearing 83. A second reduced portion 86 is provided on shaft 74 which likewise is supported in a bearing 87 identical with bearing 83 which is in turn supported in a bearing block 87A, which block is positioned on plate 80 by bolts 81.

Supported from reduced portion 88 which is provided adjacent reduced portion 85 of countershaft 74 is a brush hanger generally designated 89. Hanger 89 comprises a sleeve 90 supported on a pair of sealed bearings 91 and provided with a depending member 92. Adjacent each of the bearings 91 is provided seals 93 and 94. Secured to member 92 by bolts 95 is arm 96 to which is attached idler hub assembly generally designated 97. The attachment of arm 96 to member 92 by bolts 95 allows removal of hub 97 so that worn-out brushes may be replaced or so that various brushes or scarifying tools may be substituted. Hub assembly 97 is secured to arm 96 by a plurality of bolts 98, one of which is shown. Bolts 98 support bearing block 99 in which is provided a self-aligning bearing 100 which in turn supports idler shaft 101 which is provided with an integral retaining flange 102. To shaft 101 is pinned by a pin (not shown) the idler hub 103. Positioned between bearing 100 and the innermost end of hub 103 is a seal 104. Hub 103 is provided with channels 105 in which is positioned a plurality of engaging prongs on the brush 107 to seat the brush thereon. A protective cap 106 is positioned in arm 96 over flange 102 and serves to keep dirt and extraneous matter out of the assembly.

The arm 96 is provided with a rearward extension 108 best shown in Figure 7 for pivoting the arm 96 about the countershaft 74 as will be later explained.

Positioned on a reduced right end portion 109 of countershaft 74 (with reference to Figure 5) adjacent reduced portion 86 is a brush hanger and drive assembly, generally designated 110. This assembly comprises a sleeve 111 welded to a hanger housing 112. Sleeve 111 is supported by a pair of sealed bearings 113 which are spaced apart by a sleeve 114. Positioned between the innermost bearing 113 and bearing 87 is a seal 115 and positioned between a multiple pulley 116 and the sleeve 111 is a second seal 118.

Multiple belt pulley 116 is secured to the extreme end of countershaft 74 by a tapered bushing 120 which is similar to bushings 66 and 75. A plurality of V-belts is passed over pulley 116 and likewise is passed over a second multiple belt pulley 121.

Positioned on the housing 112 is a belt tightener assembly, generally designated 122. Belt tightener 122 comprises an idler pulley 123 positioned on a pair of bearings 124 which are in turn positioned on stud shaft 125. A plug button 126 serves to close the end of pulley 123. Stud shaft 125 is hung from arm 128 which is in turn supported on pivot bolt 129 and which is biased by a coil spring 130 to exert tension on the V-belt runs.

Multiple belt pulley 121 is provided with a bushing 131 similar to bushings 120, 75 and 66, by means of which it is maintained in position on brush drive shaft 132. Shaft 132 is supported by a pair of bearings 133 which are spaced apart by sleeve 134 and in turn supported by cylindrical member 135 welded to housing 112. Drive hub 136 is pinned to the end of shaft 132 by a pin, not shown, and is provided with grooves 138 into which prongs of the brush 107 shown in dotted lines in Figure 5 are inserted. The brush 107 forms no part of this invention per se, consequently will not be illustrated in detail.

The housing 112 is provided with a rearward extension 117, best shown in Figure 7 for pivoting the housing 112 about the countershaft 74 as will be later explained.

Secured to the extreme leftward end of the countershaft with reference to Figure 5 is a sprocket 140 around which is passed a chain 141 which is also passed around a sprocket 142 secured to shaft 143 of hydraulic pump 144. Sprocket 140, chain 141, and sprocket 142 are positioned in housing 139 secured to shell 13. Housing 139 is provided with an inspection plate 137 for access thereto.

Pump 144 is a conventional hydraulic pump supplying fluid to a tank 145. Pump 144 is secured to a vertical supporting member 146 (which is welded to the shell 13) by a plurality of bolts in slotted apertures, not shown. An adjustment screw 148 is provided for determining the vertical position of the pump for determining the tension on chain 141. Positioned adjacent pump 144 is hydraulic supply tank 145 which is bolted to plate member 149 by bolts 150.

Secured to right end 150 of the shaft of motor 18 is a multiple belt pulley 151 adjacent which is positioned a clutch 152. The extremity of shaft 150 is positioned in an outer bearing block 153 secured by bolts to the frame or shell 13 as shown best in Figure 5. The clutch 152 is a conventional centrifugal clutch adapted for engaging the multiple belt pulley 151 to shaft 150 for rotation therewith and will not be illustrated since it forms no part of this invention per se.

The multiple belt pulley 151 serves to drive a second multiple belt pulley 155 which drives the shaft of the transmission generally designated 156. Secured to the shaft 158 of transmission 156 is a support 159 carrying a brake drum 160. Support 159 has attached thereto by a plurality of bolts a sprocket 161 around which is positioned chain 162, shown best in Figure 4, which through sprocket 163 serves to rotate differential 164. Differential 164 through a pair of shafts 165 and 166, to which are affixed gears 167 and 168, respectively control the rotation of the drive wheels 11, shown best in Figure 6. This differential operates in a conventional manner and will not be explained in great detail since it forms no part of the invention per se.

Gear 167 cooperates with gear 169 which is secured to stub shaft 170. At the end of shaft 170 is secured a bevel gear 171 which cooperates with gear 172 to drive left wheel 11 through shaft 173.

Likewise, gear 168 cooperates with gear 175 which is secured to shaft 176 for driving the other wheel 11. The structure is identical for each wheel 11, consequently is only shown with reference to one of the wheels.

A tie rod 178 is provided for connecting shafts 170 and 176 and is provided with links 179 connected to the steering wheel 20 in a conventional manner.

Each of the shafts 170 and 176 is supported in a housing 181 and 182 respectively, which is welded to cross portion 183 of shell 13. Housings 181 and 182 are stationary and are provided with cooperating housings 184 and 185 adapted for rotation relative thereto by bearings 186 and 188.

Figure 6:
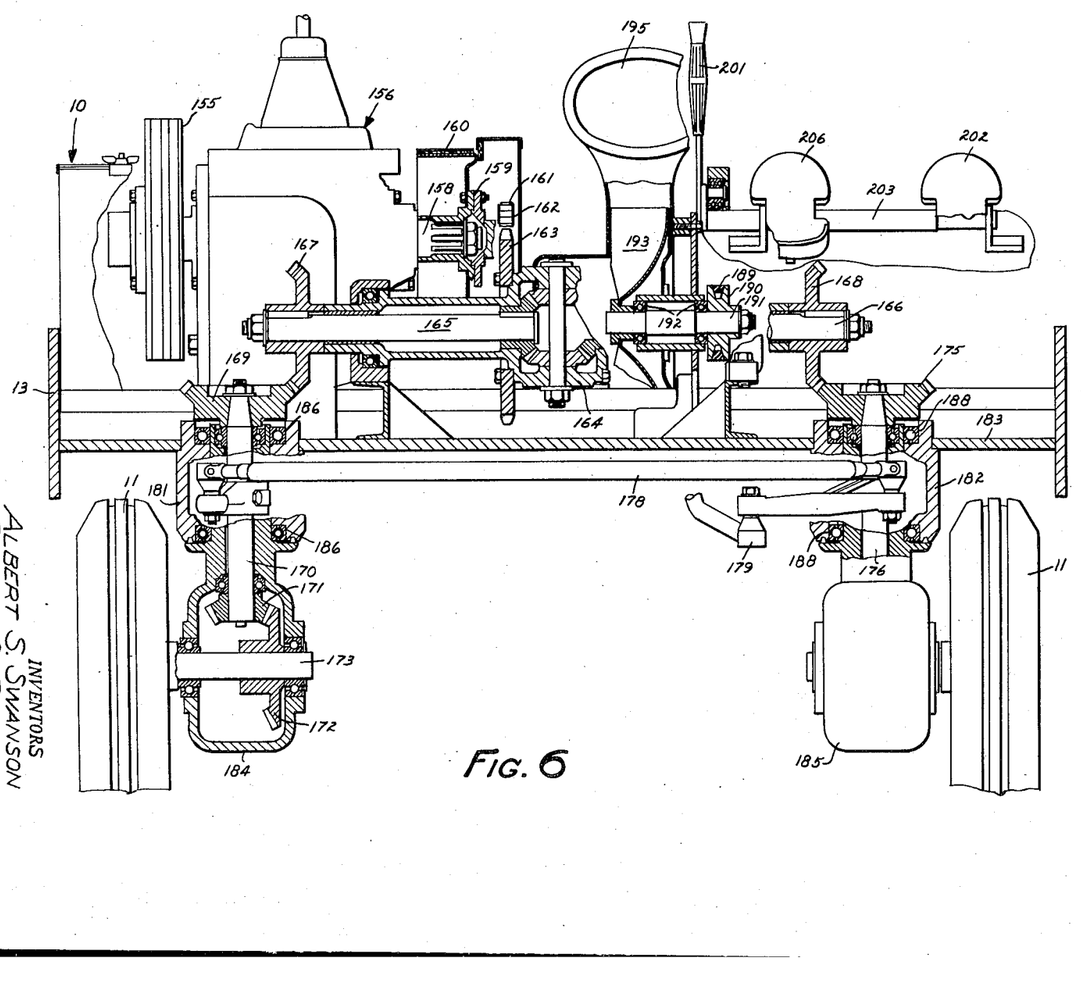
Figure 6 is a transverse vertical sectional view taken through the rear portion of the machine and showing the drive of the driving wheels.

The single belt pulley 65, shown best in Figure 5, is provided with a V-belt which is trained around a single belt pulley 190 as shown best in Figure 6. Pulley 190 is secured to shaft 191 supported in a pair of spaced bearings 192 and provided with a fan 193 at the other end thereof so that as pulley 65 is rotated by the motor 18, it will rotate pulley 190 which through shaft 191 will rotate fan 193 to cause a vacuum to be induced adjacent brush 107 and through outlet 195.

Figure 4:
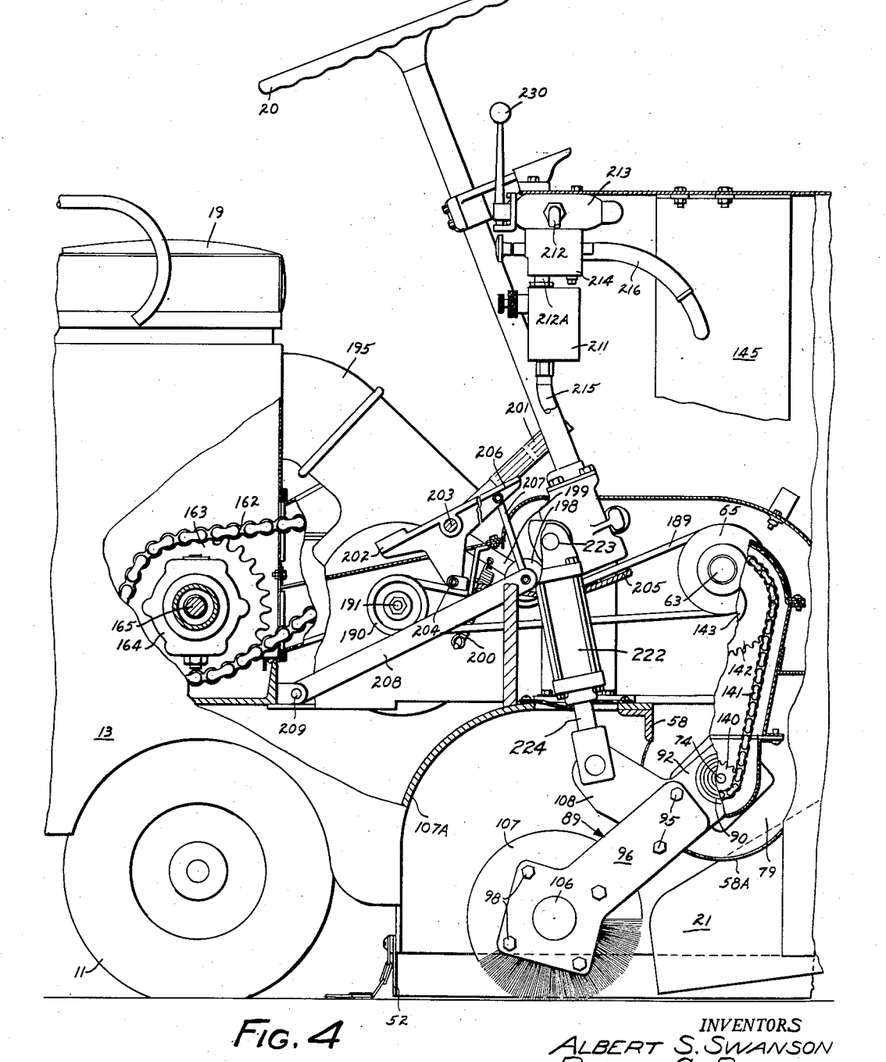
Figure 4 is an enlarged fragmentary side elevational view of the mid-portion of the machine, partially in section and showing the details of the brush mounting.

As shown best in Figure 4, there is provided for belt 189 which is trained over pulleys 190 and 65 a tightening roller 198 positioned on the lever arm 199 which is spring biased by a coil spring 200 to tighten the belt as shown in the position of Figure 4. A release handle 201 is connected to lever 199 so that the roller 198 will be released from belt 189 and the belt may be removed. In some situations it is desirable to run the machine without the blower or fan 193 in operation in which instance the belt would be removed.

Also shown in Figure 4 is a conventional gas pedal 202 which is pivoted at 203 and has a clevis 204 connected to the flexible cable 205 which leads to the carburetor for controlling the flow of gasoline thereto in the usual manner. Positioned adjacent pedal 203 is a pedal 206 which through lever 207 pivoted to lever 208 which is pivoted at 209, controls the engagement of brake shoes with the brake drum 160. The connections from lever 208 to the shoes are not shown inasmuch as this is conventional and forms no part of the invention per se.

The reasonably air-tight open-bottomed enclosure previously referred to and from which fan 193 is positioned to withdraw air is formed by the cooperation of pan 21, retainer 55, braces 56 and 58, a transverse countershaft wrap 58A and brush housing 107A which extends transversely across frame 13 as shown best in Figure 4, together with flap 52 positioned on the edge thereof, and the doors 16 of shell 13. This housing provides a means whereby dust may be evacuated from around the brush and the pan under a negative pressure by operation of fan 193 if desired.

Figure 7:
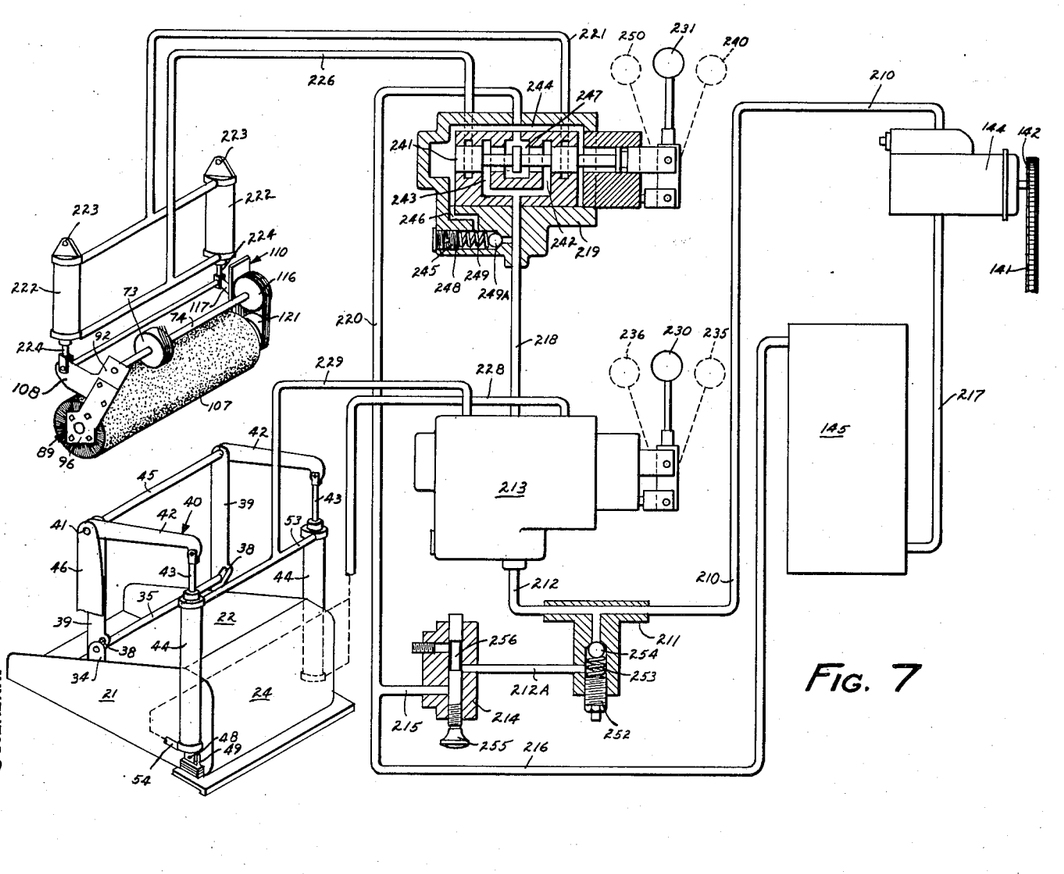
Figure 7 is a schematic view of the hydraulic control circuits of our machine and showing brush and pan control valves.

Referring now specifically to Figure 7, there is illustrated a hydraulic control system for this machine. Thus, there is shown the pump 144 driven by chain 141 from sprocket 140 of countershaft 74. The pump is in continuous operation and serves to provide pressure to line 210 which leads to a relief valve 211. From relief valve 211, line 212 leads to a pan valve 213 and line 212A leads to a selector valve 214. From selector valve 214, line 215 joins with line 216 to return to tank 145.

From pan valve 213 a line 218 leads to an identical valve 219 which is a brush control valve. From brush control valve 219 line 220 leads back to line 215 of selector valve 214 and back to tank 145. Line 221 leads from brush control valve 219 to the hydraulic cylinders 222 which are pivoted at their upper ends 223 to shell 13 and are provided with extending piston rods 224 which are attached to arms 108 and 117 respectively of the brush 107. Leading from the bottom of cylinders 222 is a line 226 which returns to valve 219.

Leading from pan control valve 213 is a line 228 which connects to cylinders 44 through conduits 54 for controlling the movement of the pan 21 from the position of Figure 2 to the position of Figure 1. Connected to the upper ends of cylinders 44 by conduits 53 is a line 229 which leads back to valve 213.

The handle 230 of valve 213 is spring biased and will return to a neutral position whenever released. However, the handle 231 of valve 219 is not spring biased and will remain in the neutral or full line position shown in Figure 7 or either one of the dotted line positions in which it is placed.

Thus the pump 144 provides fluid under pressure to line 210 and the line 212 to the valve 213 thence through line 218 to valve 219 through line 220 and line 216 back to tank 145. When the handle 230 is pulled to the dotted line position 235 it operates to force piston rod 43 to the position shown in Figure 2 which lifts the pan from the position of Figure 1 to the position of Figure 2. Since the handle 230 is spring biased and returns to neutral the pan will be hydraulically locked and remain in that position when so placed. When it is desired to lower the pan from the position of Figure 1 to the position of Figure 2, the handle 230 will be pushed to the dotted line position 236, which will supply fluid to line 229 for retracing the pistons and rods 43 to the position of Figure 1.

The operation of the valve 213 will be explained in greater detail with reference to the operation of valve 219.

When the handle 231 of valve 219 is pulled to the dotted line position 240, it pulls the spool 241 to the right with reference to Figure 7 so that a connection is established between lines 218 and 221. The handle 231 remains in the dotted line position 240 inasmuch as this handle is not spring biased as handle 230 of valve 213. At this time, spool 241 has moved to the right so that end 242 of the U-channel 242—243 will conduct fluid to line 221. The movement of spool 241 to the right also moves the enlarged left-end portion thereof so that end 243 of U-channel 242—243 is blocked and no fluid will flow through end 243 to line 226. The transmission of pressure through line 221 to cylinders 222 will force the pistons 224 downwardly with reference to Figure 7 so that the brush 107 is moved into contact with the surface to be swept. Fluid will be transmitted through the return line 226 via header 244 of valve 219 through center port 247 thence to line 220 and back to tank 145.

Valve 219 is provided with a relief valve 245 so that if pressure unduly builds up in line 218 the relief valve 245 will operate to permit fluid to flow through valve port 246 directly to header 244 and thence to line 220 and return to tank 145. Thus, the relief valve 245 serves as a safety or check to prevent excessive pressure being applied on the brush 107. This valve is provided with a threaded head 248 which may be adjusted to vary the pressure on tension spring 249 to determine the force with which ball 249A will be seated and hence to control the pressure at which valve 245 relieves.

The selector valve 214 and a pressure relief valve 211 are arranged in parallel for cooperation as shown in Figure 7. Valve 211 is substantially identical with valve 245. When excessive pressure is built up in line 210 the ball 254 will press against spring 253 which is adjustable by threaded member 252 and hence will permit flow of fluid to line 212A. The tension on spring 253 is usually less than the tension on spring 249 as will be more fully explained subsequently. However, even though fluid under excessive pressure is forced past ball 254 into line 212A, no relief will be provided when the selector valve 214 is in the position shown in Figure 7, and the valve 245 will act as the only functioning relief valve.

However, when the handle 255 of selector 214 is pulled so that reduced portion 256 of the valve stem allows fluid to flow from line 212A to line 215, and thence to line 216 and back to tank 145, the valve 211 will be operative to provide relief for line 210 before any action of valve 245. Thus, when reduced portion 256 connects lines 212A and 215, relief is provided for fluid in line 210 and thus in lines 218 and 221 previous to any relief being provided by valve 245. Consequently, the brush 107 may be set at any desired pressure and an excess of pressure on the brush 107 tending to force the piston rods 224 back into cylinders 222 will create an excess pressure on line 221 which will be communicated back to lines 212 and 210 and relief valve 211 will function. Thus, by adjustment of the adjustable member 252 any desired pressure may be maintained upon the brush 107. This will cause the brush to "float" with irregularities in the surface being swept and the brush will neither dig into the floor nor stall out the motor.

However, when the system is in this condition, there is usually insufficient pressure to retract the brush completely when it is desired to do so. Thus, when it is desired to retract the brush 107 the handle 255 is positioned in the full-line position of Figure 7 and relief valve 211 is no longer operable. Since relief valve 245 is set at a substantially higher pressure, the handle 231 may be positioned in the dotted line position 250 whereupon the spool 241 is reciprocated leftwardly with reference to Figure 7 and line 218 connects line 226 to actuate piston rods 224 to retract the brush.

Thus, it will be seen that we have provided four positions of brush control (other than neutral position) depending on whether selector 214 connects relief valve 211 to line 216 or not. Thus, when selector 214 is in the open position, there will be provided a "soft" down and a "soft" up for the brush 107, and when the selector 214 is in the position shown in full line in Figure 7 or in closed position, there will be provided a "hard" up and a "hard" down for the brush 107.

Figure 9:
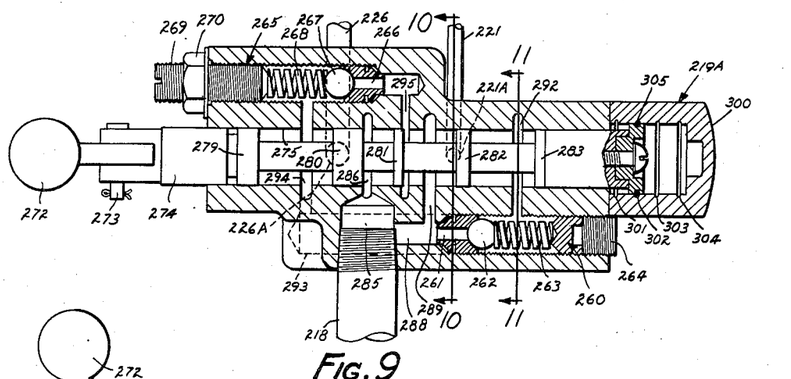
Figure 9 is a horizontal sectional view thereof.
Figure 10:
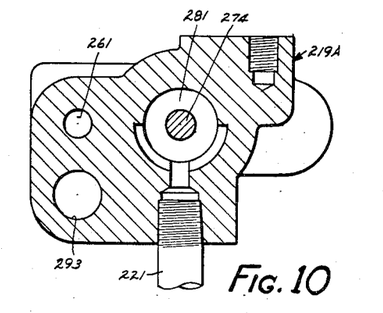
Figure 10 is a vertical sectional view taken along the line and in the direction of the arrows 10—10 of Figure 9.
Figure 11:
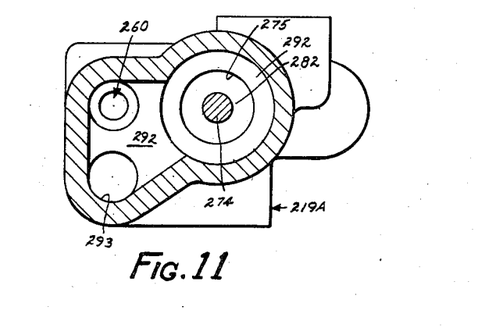
Figure 11 is a vertical sectional view taken along the line and in the direction of the arrows 11—11 of Figure 9.

Referring now particularly to Figures 9–11, there is shown a modified form 219A of the selector valve 219 of Figure 7. This modified form of valve contains the features of both the selector 214 and the brush valve 219. It is provided with an inlet port joining it to line 218, and outlet port joining it to line 221, and a second outlet port joining it to line 226. It is also provided with a third outlet joining it to line 220, or to exhaust. It is provided with an over-pressure relief valve 260 corresponding to valve 245 and an adjustable over-pressure relief valve 265 corresponding to valve 211. Valve 260 is provided with a channel 261, a spring biased check ball 262, spring 263 and an Allen head set screw 264.

Valve 265 is likewise provided with a channel 266, check ball 267, spring 268 and adjustable set screw 269 which may be locked in position by a lock nut 270.

Figure 8:
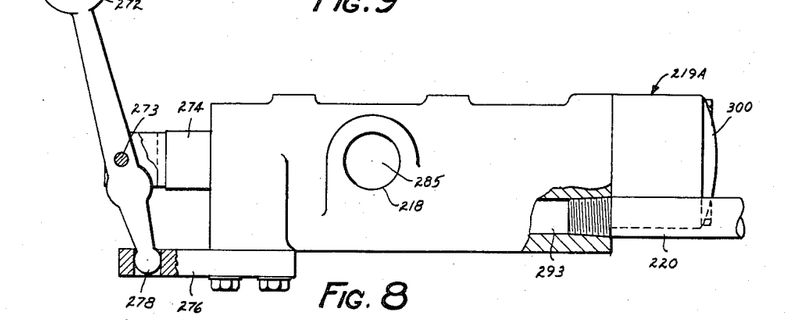
Figure 8 is a front elevation of a modified form of brush control valve.

Valve assembly 219A is provided with a handle 272 pinned by pin 273 to the extending end of spool 274. Spool 274 is reciprocable in bore 275, leftwardly and rightwardly with reference to Figure 9. Handle 272 is maintained in position in frame support 276 by balled end 278 as seen best in Figure 8. The spool 274 is provided with projections or enlarged portions 279, 280, 281, 282 and 283. The valve 219A is provided with an inlet port 285 leading to an annular passageway 286 and also to a longitudinal passageway 288 leading to a second annular passageway 289 and to the channel 261 of valve 260. Valve 260 is also connected to passageway 292, having the configuration best shown in Figure 11, which is likewise connected to a longitudinal passageway 293 to exhaust line 220. Longitudinal passageway 293 extends substantially throughout the major portion of valve 219A and is positioned behind valve 260. Its extreme leftward end (with reference to Figure 9, and shown in dotted lines) is connected to annular passageway 294 which is connected to relief valve 265. From channel 266 of valve 265 an annular passage 295 is connected to the central bore 275 of the valve assembly 219A.

Provided on valve assembly 219A is a bonnet 300 in which is provided a plurality of detent depressions 301, 302, 303, and 304 in which the detent 305 seats.

Thus, valve assembly 219A provides four positions: (1) a hold or a neutral position when the detent 305 is in depression 304; (2) a "hard" up position for the brush 107 when the detent 305 is in depression 303; (3) a "soft" up position for the brush 107 when the detent 305 is in depression 302; (4) a "soft" down position for the brush when the detent 305 is in depression 301. This sequence has been chosen so that in the manipulation of the handle 272, it is not possible to lock the brush in down position or to hold the brush in position other than "up," since the "soft" down and hold positions are on opposite ends of the detent sequence, and in order to place the brush in hold position, it must first pass through the sequence of "soft down" and "soft up" and "hard up" to hold, or neutral position.

Thus, when the detent is in depression 301, fluid may flow through passageway 218 through annular passageway 286 and central bore 275 through port 226A to force the brush cylinders down at low pressure. Fluid returning through line 221 will enter through aperture 221A to the central bore 275, from thence may discharge through annulus 292 to channel 293 and to line 220. At this time, fluid may also flow through passageway 288 to channel 261 and thence through valve 260 to annulus 292 and passageway 293 to line 220 when the relief valve 260 is actuated. Fluid may also flow through annulus 289 and thence through central bore 275 and passageway 294 to the longitudinal passageway 293 and thence through line 220 when relief valve 265 is actuated. Thus, pressure relief valves 260 and 265 are both in operation and since relief valve 265 is set at a lower pressure than valve 260, the system will operate at low pressure.

When the spool 274 is moved to position in which the detent 305 is in annulus 302, the position shown in Figure 9, the situation is reversed and fluid will exit through port 221A to line 221 to the brush cylinders and force the brush 107 upwardly and will return through line 226 from whence it will enter at port 226A thence through central bore 275, passageway 294 and thence via passageway 293 to line 220. It will likewise be seen that in this position, fluid may flow through passageways 288 and 289 to both relief valves 260 and 265 and consequently the system is again at low pressure and a "soft" up position for brush 107 is provided.

When the spool 274 is positioned so that detent 305 is in annular recess 303, there is provided the "hard" up position in which the brush will be raised at high pressure. Thus, in this position, the passageway 286 is blocked off and enlarged portion 281 of spool 274 has moved between annular passageway 289 and annular passageway 295 so that no fluid may flow to valve 265. Fluid may at this time flow to valve 260 and will flow via passageways 288 and 289 through port 221A to line 221 to raise brush 107, and will return through line 226 and port 226A whereupon it will discharge through passageway 294 through passageway 293 and thence through line 220.

When detent 305 is in annular recess 304, the brush is in the neutral or hold position. The fluid is free to flow through passageway 218, via annular passageway 286 through port 226A to line 226 which would tend to push brush 107 down. However, at this time fluid is also free to flow through central bore 275 to passageway 294 and thence to longitudinal passageway 293 to line 220; in other words, to exhaust. At the same time, passageway 295 is blocked off by enlarged portion 280 and fluid flowing through passageway 289 is trapped between enlarged portions 280 and 281. Likewise, fluid returning through line 221 and port 221A is trapped in the central bore 275 between enlarged portions 281 and 282. Consequently, the brush 107 would not be depressed even though all the pressure were not released from the line 226 by annulus 294. At this time, however, fluid may flow through valve 260 to passageway 275 and thence through passageway 293 to line 220 or to exhaust, and through valve 265 and thence through passageways 294 and 293 to exhaust, should the pressure 31 build up in the system.

As many widely differing embodiments of this invention may be utilized without departing from the spirit and scope thereof, it is to be understood that we do not limit ourselves to the specific embodiment disclosed herein.

What we claim is:

1. A fluid control system for a cleaning machine having a brush and fluid operated means for elevating and depressing the same, and having a dirt pan and fluid operated means for elevating and depressing the same, comprising in combination a source of fluid under pressure connected to a pan control valve for controlling the flow of fluid to the fluid operated means for said dirt pan, said pan control valve having means movable from a first to a second position for directing fluid under pressure to said dirt pan fluid operated means for depressing said dirt pan when said valve is in said first position and for directing fluid under pressure to said dirt pan fluid operated means for elevating said dirt pan when said pan control valve is in second position, a brush control valve having an exhaust means connected to said source of fluid under pressure and for controlling the flow of fluid to the fluid operated means for said brush, said brush control valve having means movable from a first to a second position for directing fluid under pressure to said brush fluid operated means for depressing said brush when said brush valve is in said first position and for directing fluid under pressure to said brush fluid operated means for elevating said brush when said brush valve is in said second position, and a relief valve connecting said source of fluid under pressure to said exhaust means, a second relief valve actuable at a lower pressure with reference thereto positioned ahead of said brush control valve and selector means for engaging or disengaging the same.

2. A fluid control system for a cleaning machine having a brush and fluid operated means for elevating and depressing the same and having a dirt pan and fluid operated means for elevating and depressing the same, comprising in combination a source of fluid under pressure connected to a first control valve for controlling the flow of fluid to the fluid operated means for said dirt pan, said valve having means movable from a first to a second position for directing the fluid under pressure to said fluid operated means for depressing said dirt pan when said valve is in said first position and for directing the fluid under pressure to said fluid operated means for elevating said dirt pan when said valve is in second position, said valve including a first over-pressure relief valve, a second control valve for controlling the flow of fluid to the fluid operated means for said brush, said valve having means movable from a first to a second position for directing the fluid under pressure to said fluid operated means for depressing said brush when said valve is in said first position and for directing the fluid under pressure to said fluid operated means for elevating said brush when said valve is in second position, said second control valve including a second relief valve, a third relief valve adapted to relieve pressure at a lower pressure than said first and second relief valves positioned parallel to said second control valve, and selector means for engaging or disengaging the same.

3. The apparatus of claim 2 further characterized in that said movable means in said first control valve is spring biased to neutral position.

4. The apparatus of claim 2 further characterized in that said movable means for said second control valve will remain in first or second position when so placed.

5. A power driven cleaning machine comprising in combination, a wheeled frame, a dirt receptacle having a portion thereof resting on the frame so as to be supported in a downwardly and rearwardly inclined position and having an open mouth directed opposite to the normal direction of movement of said wheeled frame, brush means for sweeping dirt into said receptacle said receptacle having a hinged closure, said hinged closure being hinged thereon near the upper part of the receptacle, said closure being oppositely disposed to the open mouth thereof, and means for elevating said receptacle to an elevated position, said means being pivotally connected to said receptacle only at a point adjacent said open mouth whereby as said receptacle is elevated it will tilt under influence of gravity and said hinge closure will be depressed below said open mouth and means for releasing said hinged closure whereby material may be ejected from said receptacle by gravity.

6. A power driven cleaning machine comprising in combination, a power driven vehicle having a supporting frame, a receptacle having one side thereof open, said receptacle having a portion thereof resting on the frame so as to be downwardly and rearwardly inclined and so as to have the open side thereof disposed in a direction opposite to the normal direction of travel of said vehicle, means for directing dirt into said receptacle, said receptacle having upwardly inclined sides and a closure thereon opposite said open side, said closure being hinged near the upper part of said receptacle, means for opening said closure, means for elevating said receptacle comprising in combination, a pair of arms pivoted to the top of said receptacle only at points adjacent said open side, said arms being pivotally connected to said frame, and means for pivoting said arms about their pivotal connection to the frame whereby when the receptacle is elevated it will tilt under the influence of gravity and the end of said receptacle having said hinged closure will swing downwardly under the influence of gravity, for dumping said receptacle when the hinged closure is opened.

References Cited in the file of this patent

UNITED STATES PATENTS

| Number | Name | Date |
|---|---|---|
| 1,003,937 | Miller | Sept. 19, 1911 |
| 2,103,984 | Indge | Dec. 28, 1937 |
| 2,248,012 | Phillips | July 1, 1941 |
| 2,289,024 | Lambert | July 7, 1942 |
| 2,317,680 | Fitzpatrick | Apr. 27, 1943 |
| 2,318,851 | Griffith | May 11, 1943 |
| 2,530,720 | Paulson | Nov. 21, 1950 |
| 2,548,676 | Milz et al. | Apr. 10, 1951 |
| 2,608,823 | Silver et al. | Sept. 2, 1952 |
| 2,611,249 | Ashton | Sept. 23, 1952 |
| 2,614,279 | Mott | Oct. 21, 1952 |
| 2,631,314 | Fitzpatrick | Mar. 17, 1953 |